(12) United States Patent
Nakano et al.

(10) Patent No.: US 7,070,343 B2
(45) Date of Patent: Jul. 4, 2006

(54) SECTOR DRIVE ASSEMBLY FOR CAMERA

(75) Inventors: Yoichi Nakano, Chiba-ken (JP);
Hiroshi Takahashi, Chiba-ken (JP)

(73) Assignee: SEIKO Precision Inc., Narashino (JP)

( * ) Notice: Subject to any disclaimer, the term of this patent is extended or adjusted under 35 U.S.C. 154(b) by 111 days.

(21) Appl. No.: 10/828,003

(22) Filed: Apr. 20, 2004

(65) Prior Publication Data

US 2004/0223758 A1    Nov. 11, 2004

(30) Foreign Application Priority Data

Apr. 23, 2003   (JP) ............................. 2003-118817

(51) Int. Cl.
*G03B 9/08*     (2006.01)
*G03B 9/40*     (2006.01)
*G03B 17/00*    (2006.01)

(52) U.S. Cl. ..................... 396/456; 396/463; 396/489; 396/543

(58) Field of Classification Search ................ 396/489, 396/452, 453, 454, 456, 463, 483–488, 491, 396/492, 470
See application file for complete search history.

(56) References Cited

U.S. PATENT DOCUMENTS

| | | | | |
|---|---|---|---|---|
| 4,306,164 A | * | 12/1981 | Itoh et al. | 310/49 R |
| 4,893,142 A | * | 1/1990 | Ishida et al. | 396/463 |
| 5,117,137 A | * | 5/1992 | Kobayashi | 310/49 R |
| 5,555,059 A | * | 9/1996 | Seo et al. | 396/463 |
| 5,926,663 A | * | 7/1999 | Suzuki | 396/449 |
| 6,253,030 B1 | * | 6/2001 | Miyauchi et al. | 396/195 |
| 6,485,200 B1 | * | 11/2002 | Tanikawa et al. | 396/489 |
| 6,536,962 B1 | * | 3/2003 | Takahashi | 396/466 |
| 2002/0110377 A1 | * | 8/2002 | Toyoda | 396/489 |

* cited by examiner

*Primary Examiner*—W. B. Perkey
*Assistant Examiner*—Rishi Suthar
(74) *Attorney, Agent, or Firm*—Adams & Wilks

(57) ABSTRACT

A sector drive assembly for a camera with reduced power consumption has a base plate having an aperture, one or more sectors capable of opening and closing the aperture, an electromagnetic actuator for driving the sectors, a drive force transmitting mechanism for transmitting a drive force of the electromagnetic actuator to the sectors, a first detecting unit for detecting when the sectors are open, and a second detecting unit for detecting when the sectors are closed, wherein the supply of power to the electromagnetic actuator is controlled based on signals from the first and the second detecting units.

19 Claims, 7 Drawing Sheets

SECTOR DRIVE ASSEMBLY FOR CAMERA

BACKGROUND OF THE INVENTION

1. Field of the Invention

The present invention relates generally to a sector drive assembly for a shutter of a camera and the like and, more particularly, to a sector drive assembly for driving, for example, a light-shielding device of a digital camera.

2. Description of the Related Art

In the related art, the initial position of a sector drive assembly for a camera is a position where a plurality of sectors are fully-closed. In order to detect the initial position of the sectors, a home switch comprised of a spring and a spring bearing has been proposed, as disclosed, for example, in Japanese Patent Document JP-A-2002-196392. The spring of the home switch is supported by a shaft secured to a base plate, the spring being fixed at one end and free at the other end. The spring bearing is fitted onto the shaft and secured to the base plate at a position where the free end of the spring can resiliently come into and out of contact therewith at a predetermined resilient force. A state in which the free end is out of contact with the spring bearing is a state in which the home switch is OFF, and is set as the initial position of a sector drive ring.

At the initial position where the home switch is OFF, when a rotor shaft and a pinion gear are rotated by an actuator, in association with the rotation, the pinion of the gear rotates to rotate the sector drive ring. The sectors start to open by the rotation of the sector drive ring. At the same time, a drive pin moves clockwise, and a pressing force of a switch driving lever toward an arm is released. Then, the switch driving lever becomes free and releases the pressing force exerted on the free end of the spring. Therefore, the free end of the spring comes into resilient contact with the spring bearing at a predetermined resilient force determined by the resiliency of the spring to turn the home switch ON. When the home switch is turned from the OFF state to the ON state, the releasing action of the sectors is detected. Then, when a required exposure time has elapsed, the actuator is rotated in the reverse direction to bring the sector drive ring back to the initial position, and the home switch is turned from the ON state to the OFF state, thereby detecting that the sectors have returned to the initial position.

In the case of a focal-plane shutter, a switch as described above may be provided at an operating limit of each sector drive lever of the front curtain and the rear curtain, respectively, for detecting the termination of travel of the sector drive levers.

In the proposed home switch described above, the initiation of movement or the return to the initial position of the sectors are detected by a single switch. That is, after the initiation of movement of the sectors, open control is performed until the sectors return to the initial state. Since it is open-controlled, drive control during that period is determined with a significant margin for the actual operation. Since environmental conditions such as ambient temperature changes, variations in battery voltage, age deterioration (durability) of components, and the like, must be taken into consideration, an electromagnetic actuator is supplied with redundant power for a predetermined period of time even after the actual shutter operation has been terminated. The same applies in the focal-plane shutter. The termination of travel of each sector drive lever is detected respectively by each of the individual switches, while performing open control, in which only the termination of travel of the sectors or the lever is detected. A problem arises based on the use of plural switches in that additional space for providing plural switches is not available in the shutter, which must be downsized.

SUMMARY OF THE INVENTION

In view of the foregoing, an object of the present invention is to provide a sector drive assembly for a camera, which occupies less space and reduces power consumption.

In order to solve the foregoing problem, a sector drive assembly for a camera according to the present invention includes a base plate having an aperture, one or more sectors provided on the base plate capable of opening and closing the aperture, an electromagnetic actuator for driving the sectors, a drive force transmitting mechanism for transmitting a drive force of the electromagnetic actuator to the sectors, a first detecting unit for detecting a state in which the sectors leave the aperture open, a second detecting unit for detecting a state in which the sectors leave the aperture closed, and a control unit for controlling the supply of power to the electromagnetic actuator based on signals from the first and the second detecting units. The electromagnetic actuator has two or more static stable positions, and the adjacent two static stable positions may correspond to the position where the sectors open the aperture and the position where the sectors close the aperture.

The first detecting unit includes an urging member and a pin, and the urging member is preferably configured to urge the drive force transmitting member in a direction in which the sectors close the aperture when the sectors leave the aperture open. Also, the second detecting unit includes an urging member and a pin, and the urging member is preferably configured to urge the drive force transmitting member in the direction in which the sectors open the aperture when the sectors leave the aperture closed.

DESCRIPTION OF THE PREFERRED EMBODIMENTS

Referring now to the attached drawings, preferred embodiments of the present invention will now be described. In this specification, principally, a sector drive assembly for driving sectors of a light-shielding device of a digital camera will be described. However, the invention is not intended to be limited to such a device.

Figure 1:
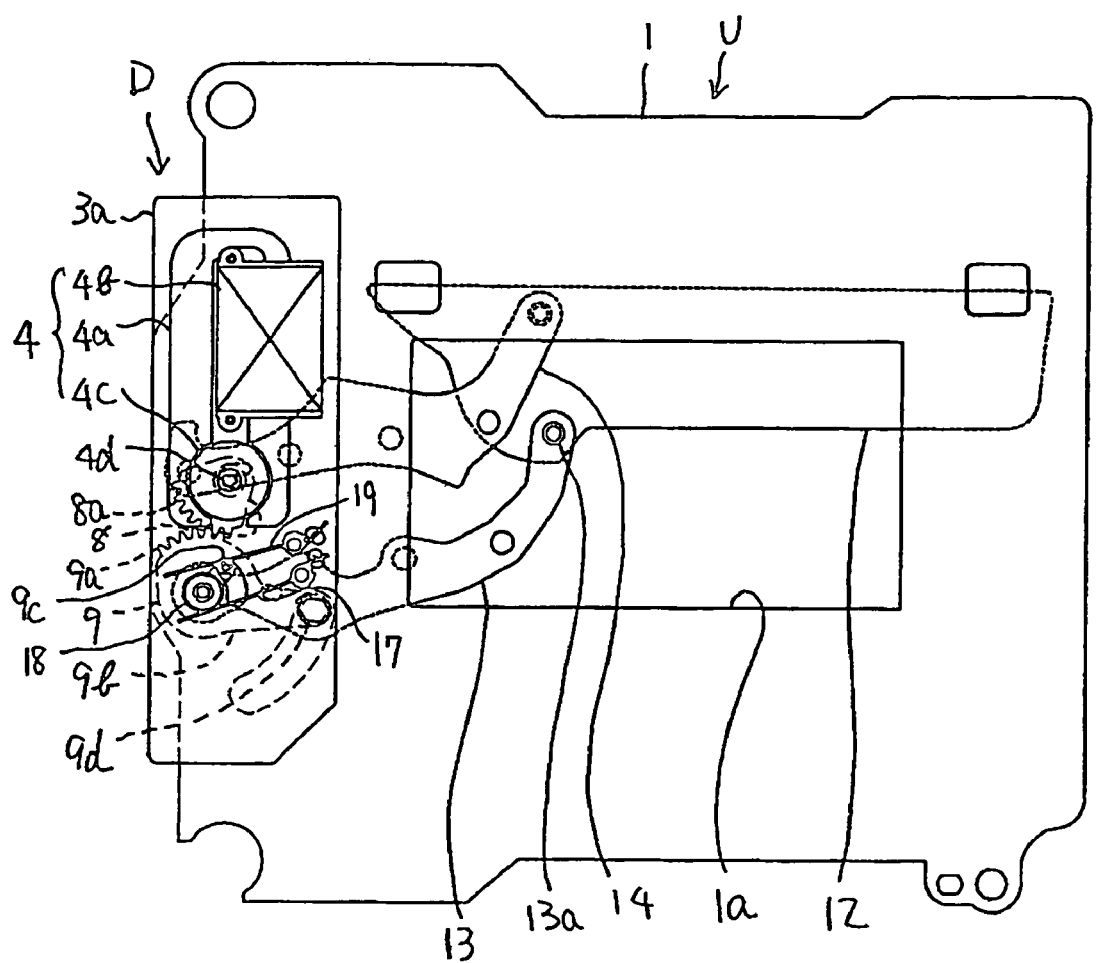
FIG. 1 is a plan view showing a preferred embodiment of a sector drive assembly for a camera according to the present invention in a state where an aperture is fully closed.
Figure 2:
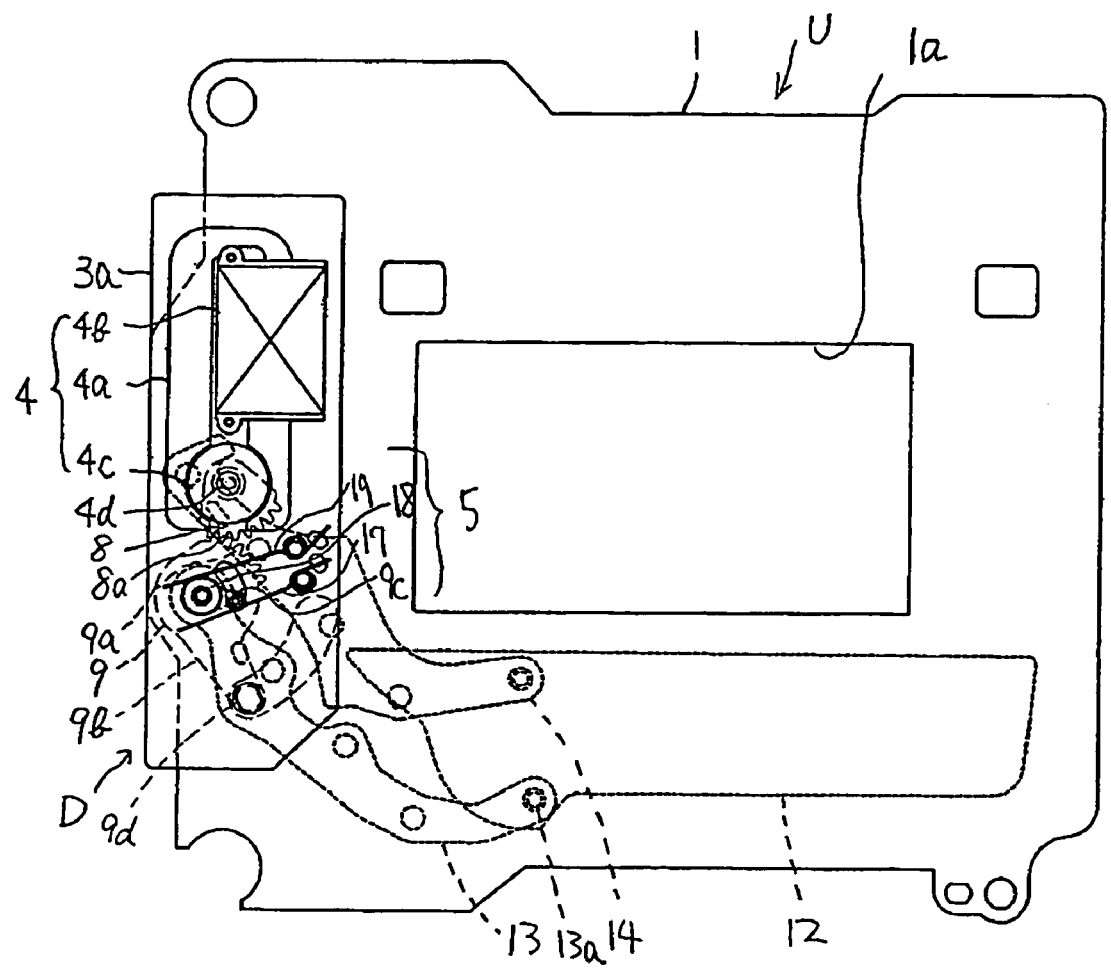
FIG. 2 is a plan view showing the preferred embodiment when the aperture is fully opened.

FIGS. 1 and 2 illustrate a principal portion of a light-shielding device of a digital camera according to a first preferred embodiment of the present invention. In the drawings, for representing the internal configuration of the digital a camera, the details of a printed circuit board P and a top plate of a support plate 3 are omitted and only the outline of the base plate is shown in order to simplify the description.

As shown in FIGS. 1 and 2, the light-shielding device is structurally similar to a focal-plane shutter in that an aperture can be opened and closed by a group of light-shielding sectors (or vanes) that superimpose and deploy with each other. However, the light-shielding device is not provided with a front curtain and a rear curtain as is a focal-plane shutter. Instead, the light-shielding device simply has a single light-shielding curtain which corresponds to either the front curtain or the rear curtain of the focal-plane shutter.

The light-shielding device of the presently described embodiment includes a base plate 1, a sector unit U comprised of a pair of sector arms 13, 14 and sectors 12 serving as a light-shielding curtain mounted to the base plate 1, and a sector drive unit D for opening and closing the sector unit U which is removably mounted to the base plate 1 of the sector unit so that it can easily be attached to and detached from the base plate 1.

The base plate 1 of the sector unit U is substantially formed of a rectangular plate and has an aperture 1a close to the center thereof. The sectors 12 and the sector arms 13, 14 are provided on the rear side of the base plate 1. The sector drive unit D is provided on the front, left-hand side of the base plate for driving the sectors 12 attached to the left-hand side (in the drawing) of the sector unit U via the sector arm 13. The sector drive unit D is positioned by a positioning pin (not shown) projecting from the surface of the base plate 1 and is secured to the base plate 1 with one or more screws 10 serving as fixing members (See FIG. 3).

The sector drive unit D includes an electromagnetic actuator (hereinafter referred to as an "actuator") 4 mounted to the support plate 3 via an intermediate member 6, a synchronous switch 5 serving as a sector position detecting unit, and a drive force transmitting mechanism T mounted on the rear surface of the intermediate member 6 (See FIG. 4). A printed circuit board P for the supply of power to the actuator 4 and the synchronous switch 5 is provided on the front of the sector drive unit D, as shown in FIG. 4.

Figure 4:
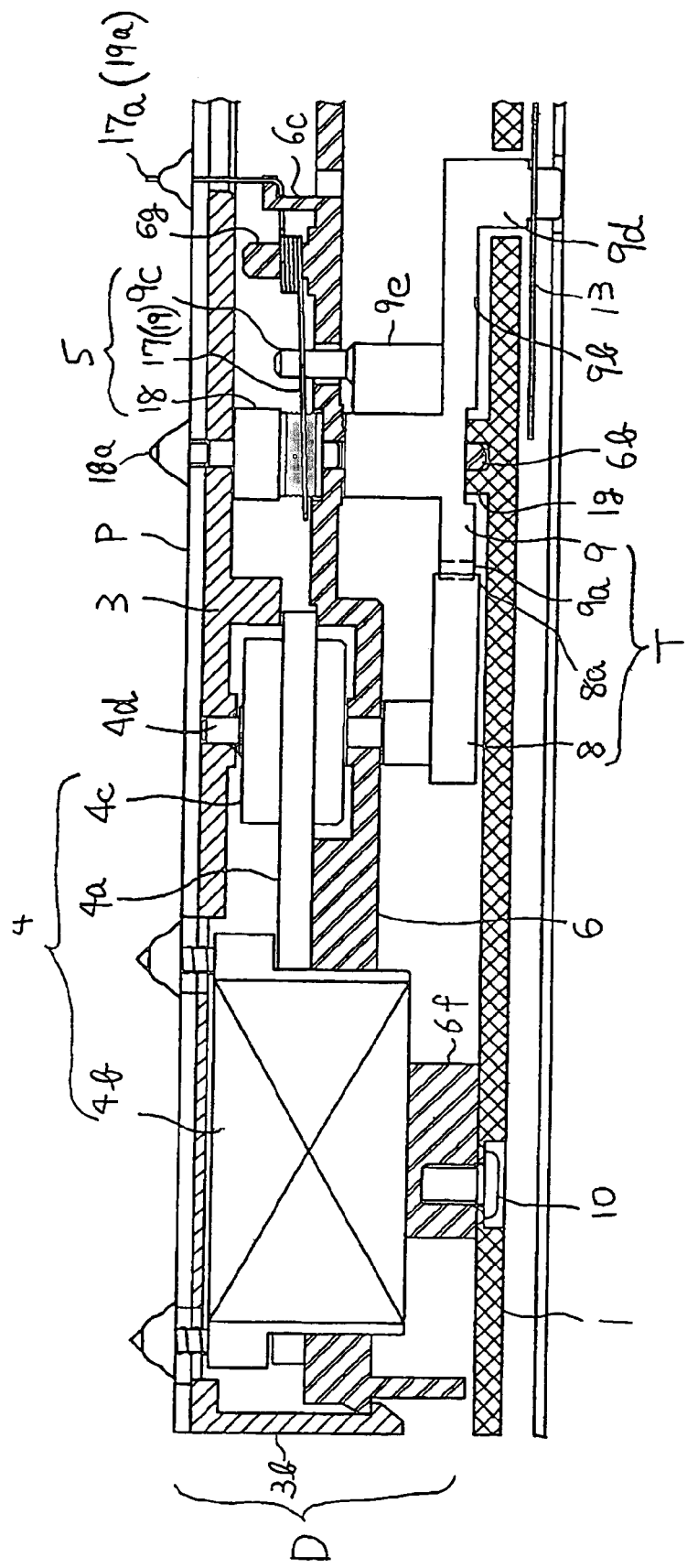
FIG. 4 is an enlarged cross-sectional view of the principal portion of the preferred embodiment.

FIG. 4 is an enlarged cross-sectional view of principal components of each mechanism of the sector drive unit D and the sector unit U. The drive unit including the actuator 4 and the synchronous switch 5 in the drive mechanism of the sector drive unit D is secured to the rear surface of the support plate 3 via the intermediate member 6. The printed board P is secured on the front surface of the support plate 3. The support plate 3 includes a base plate member 3a formed of a rectangular plate (See FIG. 1), and latch devices 3b for holding the intermediate member 6 at both ends thereof. The intermediate member 6 is configured to be able to retain the actuator 4 and the synchronous switch 5, and the intermediate member 6 is provided with a mounting device 6f to be mounted to the base plate 1. The sector drive unit D is thus provided as an independent unit which can be easily attached to and detached from the sector unit U and can be mounted to various types of sector units.

The above-described actuator 4 employs a known pulse motor, and includes a stator 4a, a drive coil 4b, and a rotor 4c formed of permanent magnet. The actuator 4 has a plurality of static stable positions in which the rotor 4c is retained stably without the supply of power. These static stable positions are defined by the positions of the magnetic poles of the rotor 4c and the positions of the magnetic poles provided on the stator 4c. Therefore, when the magnetic poles of the rotor 4c move between the magnetic poles of the stator with the supply of power to the drive coil 4b, the rotor 4c can be retained at any static stable position statically. The number of static stable positions is determined by the number of magnetic poles on the rotor 4c and the number of magnetic poles provided on the inner peripheries of the recesses of the stator 4a, which surround the rotor. In the present case, two static stable positions are provided by the combination of two magnetic poles on the rotor 4c and four magnetic poles provided on the stator 4a. The actuator 4 is secured in a state of being pressed against the base plate 3a of the support plate 3 by the intermediate member 6. A rotary shaft 4d is formed integrally with the rotor 4c so as to penetrate the intermediate member 6 and project from the rear surface thereof.

Figure 3:
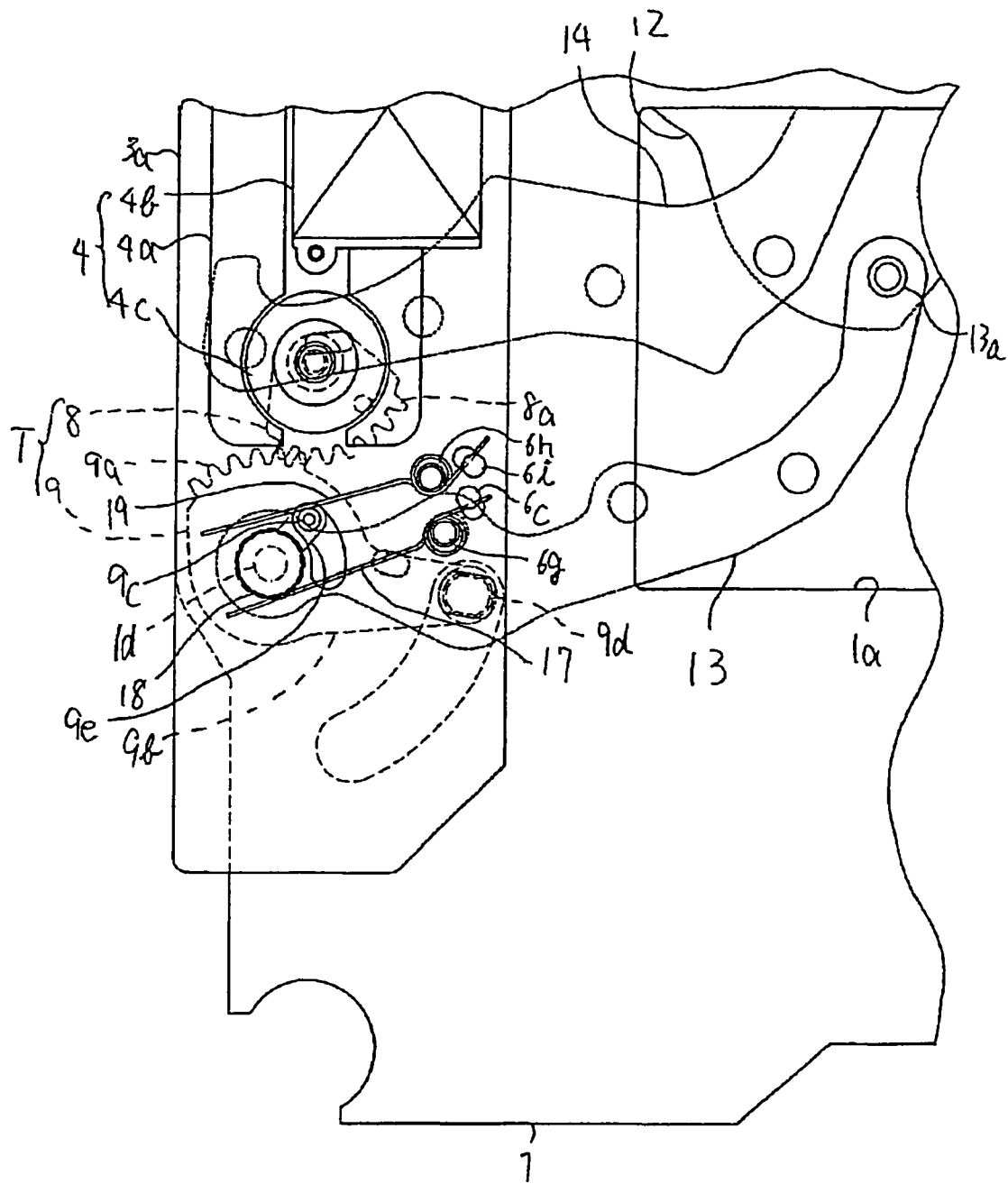
FIG. 3 is an enlarged view of a principal portion of the preferred embodiment.

A drive lever 8 constituting a part of the drive force transmitting mechanism T is fixed to the rear end of the rotary shaft 4d formed integrally with the rotor 4c of the actuator 4. A sector drive lever 9, constituting another part of the drive force transmitting member T, is interlocked with the drive lever 8 and is pivotably supported by a shaft 6b projecting from the rear surface of the intermediate member 6. The sector drive lever 9 can be interlocked with the drive lever 8 by engagement of teeth 9a thereof with teeth 8a of the drive lever 8. As shown in FIGS. 3 and 4, the drive lever 8 is formed of a fan-shaped plate member fanning out to a small extent, and the narrow end portion of the fan is secured to the rotary shaft 4d of the actuator 4 so as to be capable of integrally rotating therewith. The teeth 8a are formed at an arcuate portion at the extremity of the drive lever 8.

The sector drive lever 9 has a portion formed into an arcuate shape in a range of a predetermined distance from the rotational center, and this arcuate portion is provided with the teeth 9a along a portion of the periphery thereof. The teeth 9a of the sector drive lever 9 engage the teeth 8a of the drive lever to form a gear transmission mechanism. Part of the arcuate portion of the sector drive lever which is not provided with the teeth 9a extends outward and is formed into an arm member 9b. On the front surface of the periphery (See FIG. 4), a contactable pin 9c is provided at the extremity of a short arm 9e so as to project forward. On the rear surface of the extremity of the arm member 9b, there is provided a drive pin 9d engageable with the sector arm 13 for driving the sector unit U described above.

With this arrangement, the drive force transmitting member T is configured in such a manner that the drive lever 8 is pivoted by the rotation of the actuator 4, and the sector drive lever 9 is interlocked with the drive lever 8 via the gear transmission mechanism. The pivoting angle of the drive lever 8 corresponds to the gear ratio. The pivoting angle of the sector drive lever 9 is the same as the pivoting angle of the sector arm 13. Thus, the amount of reciprocal motion of the sectors 12 is determined depending on the pivoting angle of the sector drive lever 9 and the length of the sector arm 13. When changing the pivoting angle of the sector drive lever 9, the gear ratio may be changed, or an abutting member which limits the pivoting angle by abutting against the sector drive lever 9 may be provided.

The synchronous switch 5 will now be described. The synchronous switch 5 used in the sector drive unit is a sector position detecting sensor for detecting the driving state of the sector drive lever 9 by means of two detecting units for detecting whether the sectors 12 are fully opened or fully closed at the time of an exposure operation. As shown in FIG. 3, the synchronous switch 5 includes a detection pin 18, which corresponds to a fixed switch strip, detection springs 17, 19, which serve as movable switch strips and urging members, positioned symmetrically with respect to the detection pin 18, and the contactable pin 9c, which is a switch operating member pivotable between the detection spring 17 and the detection spring 19. The detection spring 17 employed as a first detecting unit is a helical torsion coil spring having straight portions extending in opposite directions at both ends and a coil portion located at the center of the spring 17. The coil portion is inserted onto a shaft 6g projected from the intermediate member 6. One of the straight portions can abut against the contactable pin 9c of the sector drive lever 9 when the sectors 12 are superimposed. The other straight portion abuts against the projection 6c projected from the upper surface of the intermediate member 6. The other straight portion is bent at a right angle so as to extend upward to provide an information output section 17a by bringing the end thereof into electrical communication with the printed circuit board P, thereby supplying detected data to a CPU, which is a control unit of a camera body (See FIG. 4).

The detection spring 19 employed as a second detecting unit has the same configuration as the detection spring 17, and employs a helical torsion coil spring having straight portions at both ends extending in the opposite directions. A coil portion located at the center of the spring 19 is fitted onto a shaft 6h projecting from the intermediate member 6. One of the straight portions can abut against the contactable pin 9c of the sector drive lever 9 when the sectors 12 are deployed. The other straight portion is capable of abutting against the projection 6i projecting from the front surface of the intermediate member 6. The other straight portion is bent at a right angle so as to extend upward in the same manner as the detection spring 17 to provide an information output section 19a by bringing the end thereof into electrical communication with the printed circuit board P, thereby supplying detected data to the CPU of the camera body.

The detection pin 18 is formed of a conductive round rod member, and is supported between the printed circuit board P and the intermediate member 6 at both ends thereof. A terminal 18a at one end is in electrical communication with the printed board P. The detection pin 18 is arranged at a position where the intermediate position of the straight portion of the detection spring 17 abuts it when the sectors 12 are deployed and the aperture 1a is fully closed, and the intermediate position of the straight portion of the detecting spring 19 abuts it when the sectors 12 are superimposed and the aperture 1a is fully opened. In other words, the detection spring 17 and the detection spring 19 share the detection pin 18. Detected data indicating whether the detection pin 18 is in or out of contact with the detection spring 17 and whether the detection spring 19 is in or out of contact with the detection pin 18 can be supplied from the terminals 17a, 18a provided on the printed circuit board P. Such a contacting action is performed by the detection spring 17 or the detection spring 19 which follow the pivotal movement of the contactable pin 9c formed integrally with the sector drive lever 9.

The detection springs 17 and 19 employed as the first and the second detection units are helical torsion coil springs having straight portions extending in opposite directions at both ends and are arranged so that the detection pin 18 is interposed therebetween and the contactable pin 9c, which is a switch operating member, is pivotably movable between the detection spring 17 and the detection spring 19 where the detection pin 18 is present. Thus, two detection units can be provided in the sector drive unit without occupying much more space than a single detection unit. Therefore, the two states, that is, the initiation and the termination of the operation of a single member, can be detected without increasing the size of the sector drive unit of the related art having only a single detection unit.

As shown in FIG. 4, the integral connection between the base plate 1 of the sector unit U and the drive unit D is achieved by aligning positioning pins (not shown) provided at a plurality of locations on the front surface of the base plate 1 and positioning holes 6a formed on a mounting portion 6f of the intermediate member 6, pressing both of them toward each other, and securing them with the screws 10 serving as fixing members. FIG. 4 shows a state in which the sector drive unit D is mounted to the base plate 1. In this mounted state, the sector drive lever 9 pivotably supported by the shaft supporting device 6b projecting from the intermediate member 6 is stably supported by a projection 1g projecting from the base plate 1, and the drive pin 9b penetrates an arcuate groove 1c provided in the base plate 1 and projects toward the rear surface of the base plate 1.

Mounted on the rear surface of the base plate 1 are the sectors 12 for opening and closing the aperture 1a and the sector arms 13, 14. The base plate 1, the sectors 12, and the sector arms 13, 14 constitute the sector unit U. As shown in FIGS. 1 and 2, the sector drive mechanism includes a plurality of sectors 12 (only one of them is shown), and a parallel link mechanism including the pair of sector arms 13, 14 for reciprocating the sectors 12. The lower sector arm 13 of the sector arms constituting the parallel link mechanism is pivotably supported by the shaft 1d (See FIG. 3) which is coaxial with the rotational center of the sector drive lever 9. A hole is provided at an intermediate position of the sector arm 13 and the drive pin 9d of the sector drive lever 9 is inserted into the hole thereby enabling the arm to follow the path of the sector drive lever 9. The extremity of the first sector arm 13 is connected to the sectors 12 via the connecting pin 13a. In contrast, the sector arm 14 positioned upwardly of the sector arm 13 is pivotally supported on the upper surface of the base plate 1 at a position spaced slightly apart from the supporting portion of the sector arm 13. The extremities of the sector arms 13, 14 are pivotably connected to the sectors 12 so that the parallel link mechanism is established and the sectors 12 can be moved in parallel. The sectors 12 are protected by a sector retaining plate.

Figure 5:
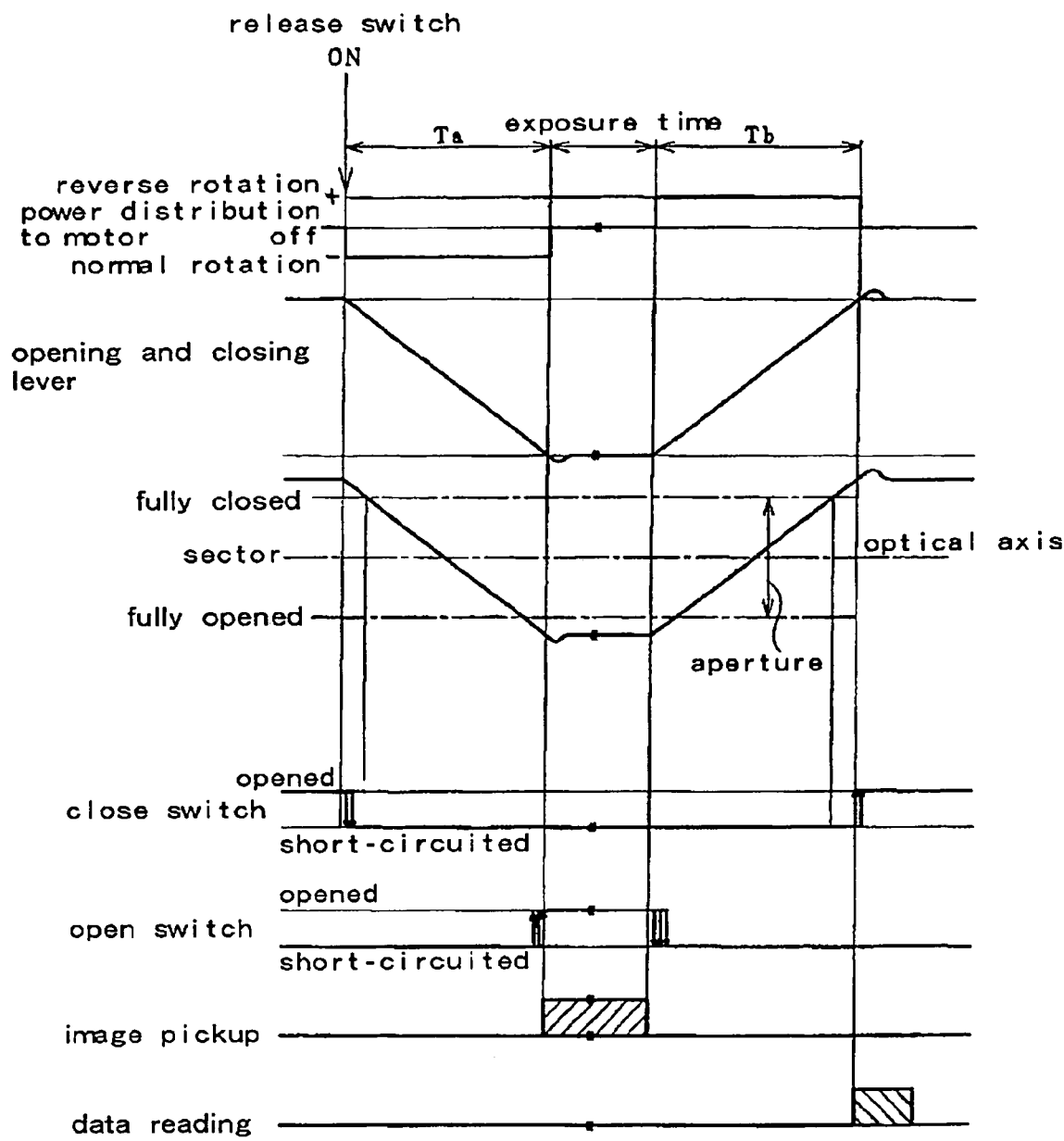
FIG. 5 is a timing chart showing the operation of the embodiment illustrated in FIGS. 1–4.

With reference to the timing chart shown in FIG. 5, the operation of the present embodiment will now be described. In FIG. 5, the phrase "opening and closing lever" represents the sector drive lever 9, a "close switch" represents the detection spring 19, and an "open switch" represents the detection spring 17. In the initial state, since the supply of power from the actuator 4 to the drive coil 4b is turned OFF, the sector drive lever 9 and the sectors 12 stand still in the initial position (static stable position). At this time, the detection spring 17 and the detection pin 18 of the synchronous switch 5 abut against each other (short-circuited) (See FIG. 1 and FIG. 3). The detection spring 19 and the detection pin 18 are spaced apart from each other (opened). Subsequently, when the release switch (not shown) of the camera body is turned ON, the CPU supplies a negative current to the drive coil 4b of the actuator 4 to rotate the rotor 4c in the normal direction so that the sectors 12 are moved via the drive force transmitting mechanism T to start opening the aperture 1a. At this time, the sectors 12 can easily start moving since the urging force of the detection spring 19 can also be used as a driving force. Therefore, the power consumption during driving is low, and acceleration can be achieved easily, whereby reduction of power consumption and high-speed operation of the sector drive can easily be realized. When the drive force transmitting mechanism T is driven, the contactable pin 9c rotates clockwise, and the detection spring 19 and the detection pin 18 come into abutment (short-circuited). Signal data generated by this change of the state is supplied to the CPU.

When the contactable pin 9c rotates, the contactable pin 9c presses the detection spring 17, and the detection spring 17 and the detection pin 18 are moved away from each other (See FIG. 2). Signal data generated by this change of the switching state is supplied. At this time, the sectors 12 are decelerated by the urging force of the detection spring 17. Thus, the impact or hitting noise generated at the termination of travel of the sectors 12 is reduced. The CPU verifies the termination of the opening operation of the sectors 12 based on the signal supplied from the two detection units for the detection spring 17 and the detection spring 19. Then, the supply of power to the drive coil 4b is turned OFF. This position is another static stable position of the rotor 4c, and the rotor 4c can remain stopped at this position without the supply of power to the drive coil 4b. In addition, since the urging force of the detection spring 17 is transmitted to the drive force transmitting mechanism T via the contactable pin 9c, the drive force transmitting mechanism T and the sector arm are in a positional adjustment state. During the time that the supply of power to the drive coil 4b is turned OFF, the CPU drives an image pickup device to perform an exposure operation (image pickup shown in FIG. 5) by the image pickup device. In FIG. 5, a plurality of arrows shown at the positions where the states of the respective switches change indicate that the switches are to be changed over at or near the positions indicated by the arrows since the positions where the switches are changed over are not constant due to the problem of accuracy of components.

The exposure operation is initiated when the CPU has received the signal data indicating the change of the switching states of the detection spring 17 and the detection spring 19, verifies that the aperture 1a is opened, and supplies an exposure-start signal to the image pickup device. During the exposure operation, since the supply of power to the drive coil 4b of the actuator 4 is turned OFF, generation of noise during the exposure operation is prevented and a reduction in power consumption is achieved. In addition, while the rotor 4c is retained at a static stable position without the supply of power to the drive coil 4b, the sectors 12 are prevented from moving accidentally.

When the exposure operation is terminated and the CPU supplies a positive current to the drive coil 4b of the actuator to make it rotate in the direction in which the sectors 12 deploy, the sector drive lever 9 rotates and, simultaneously, the sectors 12 start to close the aperture 1a. When the drive force transmitting mechanism T is driven, the contactable pin 9c rotates counterclockwise, and the detection spring 17 and the detection pin 18 are brought into abutment (short-circuited). Signal data generated by the change of the switching state is supplied to the CPU.

When the contactable pin 9c further rotates, the contactable pin 9c presses the detection spring 19, so that the detection spring 19 and the detection pin 18 are moved away from each other (opened). At this time, the sectors 12 are decelerated by an urging force of the detection spring 19, and thus the impact or the hitting noise generated when traveling of the sectors 12 is finished is alleviated. The CPU has received the signal data indicating the change of the states of the detection spring 17 and the detection spring 19 and verifies that the aperture 1a is closed. Accordingly, the sectors 12 are restored to the initial position, that is, the aperture 1a is closed, and the CPU turns OFF the supply of power to the drive coil 4b of the actuator. Since the initial position is a static stable position, it can be stopped at the initial position even when no power is supplied to the drive coil 4b. When the supply of power to the drive coil 4b is stopped, the image pickup data accumulated in the image pickup device by exposure (image pickup in FIG. 5) is supplied to the CPU (data reading in FIG. 5), whereby one imaging operation is completed. Data read from the image pickup device is supplied to the storage device in the camera body and stored there.

A second embodiment will now be described with reference to FIGS. 6 and 7. The same parts as in the first embodiment are represented by the same reference numerals and will not be described again. The difference from the first embodiment is that the detection pin 18 of the synchronous switch 5 is not shared. Instead, a detection pin 181 that comes into abutment with the detection spring 17 and a detection pin 182 that comes into abutment with the detection spring 19 are separately provided.

Figure 6:
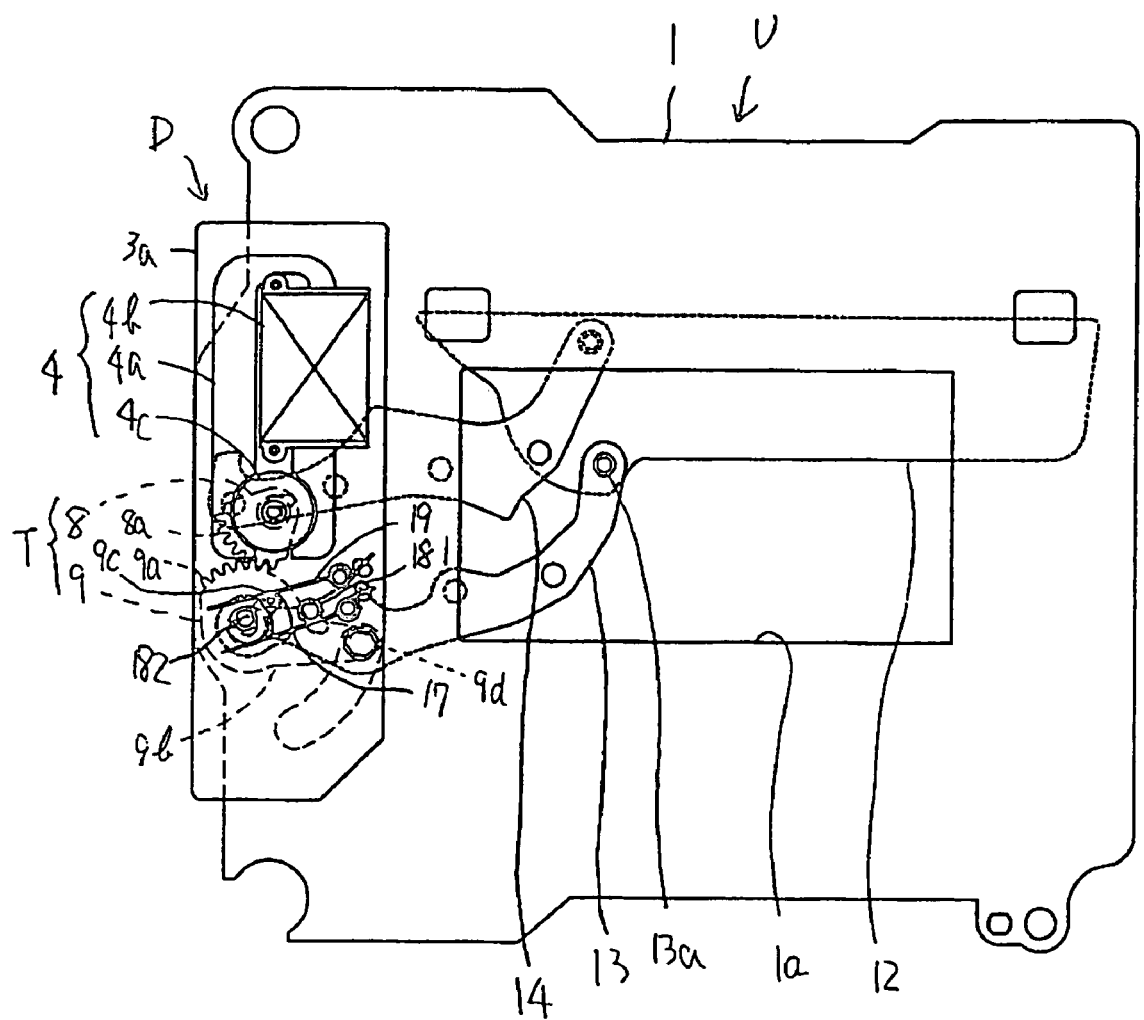
FIG. 6 is a plan view showing another preferred embodiment of a sector drive assembly for a camera according to the present invention in a state where the aperture is fully closed.
Figure 7:
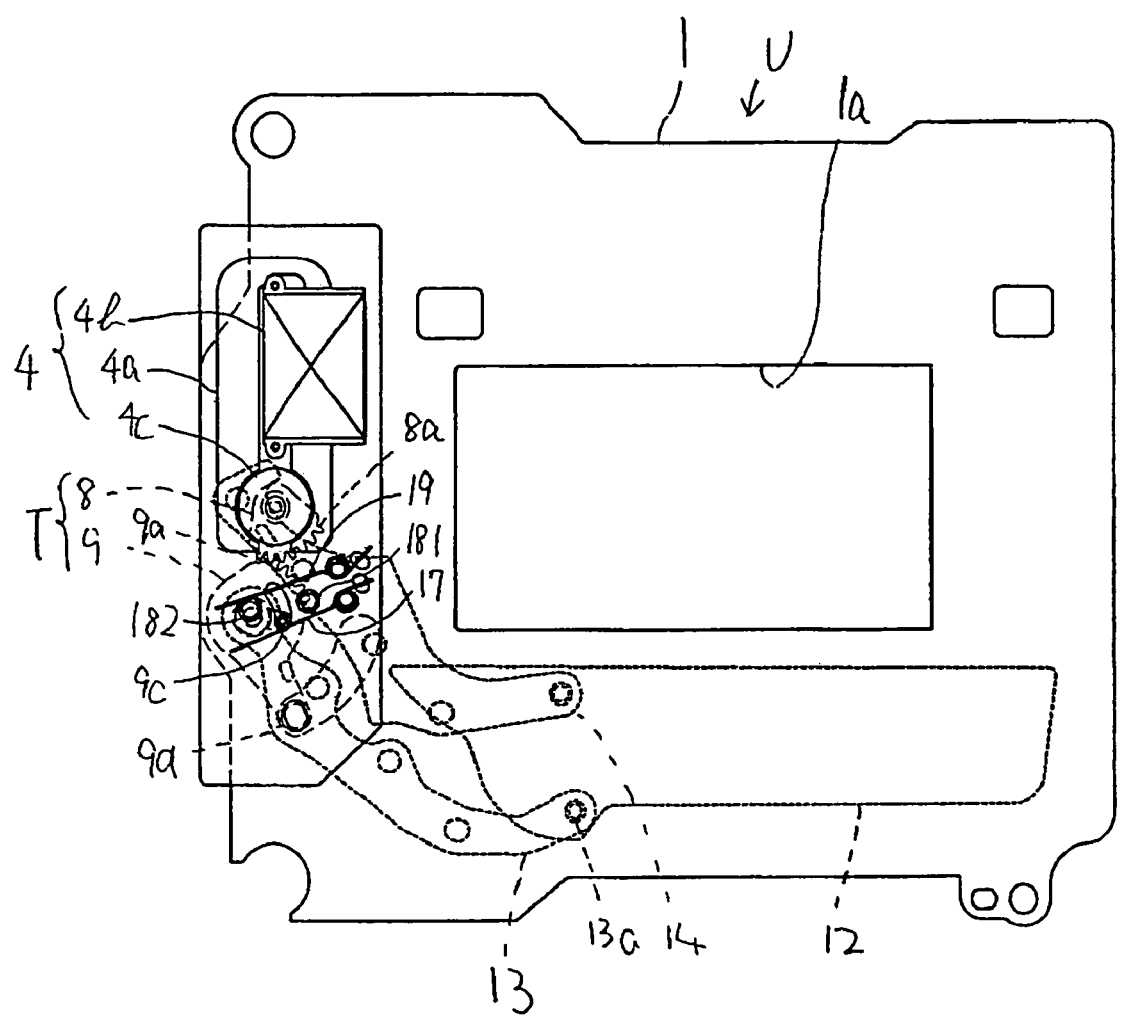
FIG. 7 is a plan view showing the other preferred embodiment in a state where the aperture is fully opened.

In the synchronous switch 5 of the second embodiment, as shown in FIGS. 6 and 7, the detection spring 17 and the detection pin 181, which correspond to the first detection unit, and the detection spring 19 and the detection pin 182, which correspond to the second detection unit, are disposed substantially symmetrically with respect to the contactable pin 9c, which is the switch operating member. In comparison with the first embodiment, one additional detection pin is provided, so that the number of components increases. However, since the detection pin itself can be downsized in the case where the detection pins are provided separately in comparison with the case in which a single detecting pin is shared, flexibility in the position at which the detection pin is arranged is increased.

In the initial state shown in FIG. 6, since the supply of power to the drive coil 4b of the actuator 4 is turned OFF, the sector drive lever 9 and sectors 12 remain still at an initial position (static stable position). At this time, in the synchronous switch 5, the detection spring 17 and the detection pin 181 come into abutment (short-circuited). The detection spring 19 and the detection pin 182 are apart from each other (opened). Subsequently, when the release switch (not shown) of the camera body is turned ON, the CPU supplies a negative current to the drive coil 4b of the actuator 4 to rotate the rotor 4c in the normal direction, and then the sectors 12 are moved via the drive force transmitting member T to start opening the aperture 1a. When the drive force transmitting member T is driven, the contactable pin 9c rotates clockwise, and the detection spring 19 and the detection pin 182 come into abutment (short-circuited). Signal data generated by the change of the switching state is supplied to the CPU.

When the contactable pin 9c rotates, the contactable pin 9c presses the detection spring 17, and hence the detection spring 17 and the detection pin 181 are moved (opened) away from each other (See FIG. 7). Signal data generated by the change of the state is supplied. When the sectors 12 terminate their opening operation and the aperture 1a is fully opened, the power distribution to the drive coil 4b is turned OFF. This position is another static stable position of the rotor 4c, where it can stop at this position even when no power is supplied to the drive coil 4b.

The detection pins 181, 182 are conductive round rod members, both ends of which are supported between the printed circuit board P and the intermediate member 6. The terminal at one end of each detection pin is in electrical communication with the printed circuit board P. When the sectors 12 are deployed and hence the aperture 1a is fully closed, the intermediate position of the straight portion of the detection spring 17 can be brought into abutment with the detection pin 181. When the sectors 12 are superimposed and fully opened, it stays away from the detection spring 17. When the sectors 12 are deployed and the aperture 1a is fully closed, the intermediate position of the straight portion of the detection spring 19 is spaced from the detection pin 182, and when the sectors 12 are superimposed and fully opened, it comes into abutment against the detection spring 17. The detected data obtained by detecting the contact states between the detection spring 17 and the detection pin 181, and the detection spring 19 and the detection pin 182 can be supplied from the terminal provided on the printed board P.

In the above description, the sector drive assembly can be incorporated not only in a light-shielding device, but also in a focal-plane shutter, a lens shutter, an aperture device, and so on. Magnetization of the rotor of the electromagnetic actuator is not limited to two locations, but may be more. In this case, there are provided more than two static stable positions. Therefore, two adjacent static stable positions may be related to the fully-opened position and the fully-closed position of the aperture. The foregoing description has been made on the assumption that power is supplied to the drive coil by a constant voltage circuit. However, it is also possible to employ a constant current circuit. Also, although a gear mechanism is employed in the drive force transmitting mechanism, other mechanisms such as a link mechanism or a slider crank mechanism may be employed instead.

According to the sector drive assembly of the present invention, the detection unit for detecting two states, that is, the state in which the sectors open the aperture, and the state in which the sectors close the aperture is provided, and the supply of power to the electromagnetic actuator can be controlled by the signal from the detecting unit. Therefore, it is not necessary to supply an excessive amount of electrical power, which results in a reduced power consumption. In addition, since the detecting unit using the urging member is provided, reduction in power consumption and a higher speed of the sector drive are achieved.

What is claimed is:

1. A sector drive assembly for a camera comprising:
a base plate having an aperture;
one or more sectors provided on the base plate for opening and closing the aperture;
an electromagnetic actuator for driving the one or more sectors between an open position in which the aperture is opened and a closed position in which the aperture is closed;
a drive force transmitting mechanism for transmitting a drive force of the electromagnetic actuator in aperture-opening and aperture-closing directions to the one or more sectors;
a first detecting unit for detecting a state in which the one or more sectors are in the open position, the first detecting unit including an electrically conductive detection pin, and a first electrically conductive detection spring engageable with the conductive detection pin and urging the drive force transmitting mechanism in the aperture-closing direction when the one or more sectors are in the open position;
a second detecting unit for detecting a state in which the one or more sectors are in the closed position, the second detecting unit including the electrically conductive detection pin, and a second electrically conductive detection spring engageable with the conductive detection pin and urging the drive force transmitting mecha-nism in the aperture-opening direction when the one or more sectors are in the closed position; and
a control unit for controlling the supply of power to the electromagnetic actuator based on signals from the first and the second detecting units.

2. A sector drive assembly for a camera according to claim 1; further including a switch operating member driven by the drive force transmitting mechanism and engageable with the first and second detection springs to switch them into and out of contact with the detection pin.

3. A sector drive assembly for a camera according to claim 2; wherein the drive force transmitting mechanism comprises a drive gear provided on a drive shaft of the electromagnetic actuator, and a sector drive gear in meshing engagement with and driven by the drive gear for driving the one or more sectors, the switch operating member being connected to the sector drive gear for movement therewith.

4. A sector drive assembly for a camera according to claim 1; wherein the electromagnetic actuator has at least two static stable positions that correspond to the open position of the one or more sectors and the closed position of the one or more sectors.

5. A sector drive assembly for a camera, comprising:
a sector unit comprising a base plate having an aperture, and one or more sectors for opening and closing the aperture; and
a sector driving unit removably mounted as a unit to the base plate and comprising a support plate, an electromagnetic actuator mounted to the support plate, a drive force transmitting mechanism mounted to the support plate for transmitting a drive force of the electromagnetic actuator in aperture-opening and aperture-closing directions to the one or more sectors, a first sector position detecting unit for detecting an open position of the one or more sectors, the first sector position detecting unit including an electrically conductive detection pin, and a first electrically conductive detection spring engageable with the conductive detection pin and urging the drive force transmitting mechanism in the aperture-closing direction when the one or more sectors are in the open position, and a second sector position detecting unit for detecting a closed position of the sectors, the second sector position detecting unit including the electrically conductive detection pin, and a second electrically conductive detection spring engageable with the conductive detection pin and urging the drive force transmitting mechanism in the aperture-opening direction when the one or more sectors are in the closed position.

6. A sector drive assembly for a camera according to claim 5; wherein the one or more sectors comprise a plurality of sectors each having sector arms connected thereto, and the sector arms are interconnected to cooperatively drive the sectors to open and close the aperture.

7. A sector drive assembly for a camera according to claim 5; wherein the drive force transmitting mechanism has an angular motion converting mechanism for converting a prescribed amount of angular movement of the electromagnetic actuator into an amount of angular movement of the one or more sectors sufficient to drive the one or more sectors from one of an aperture-opening position and an aperture-closing position to the other of the aperture-opening position and the aperture-closing position.

8. A sector drive assembly for a camera according to claim 7; wherein the electromagnetic actuator comprises a pulse motor which undergoes the prescribed amount of angular movement in response to application of voltage or current pulses to the pulse motor for driving the one or more sectors to either the aperture-opening position or the aperture-closing position depending upon the polarity of the pulses.

9. A sector drive assembly for a camera according to claim 8; wherein the pulse motor comprises a rotor having a plurality of magnetic poles, a stator having a plurality of magnetic poles, and a drive coil for driving the rotor, an angle of rotation of the rotor in response to application of a voltage or current pulse to the drive coil being defined by a relationship between positions of the magnetic poles of the rotor and positions of the magnetic poles provided on the stator.

10. A sector drive assembly for a camera according to claim 9; wherein the positions of the magnetic poles provided on the stator are static stable positions at which the rotor is retained without the supply of power to the drive coil.

11. A sector drive assembly for a camera according to claim 9; wherein the drive force transmitting mechanism comprises a drive gear provided on a drive shaft of the electromagnetic actuator and a sector drive gear driven by the drive gear for driving the one or more sectors.

12. A sector drive assembly for a camera according to claim 5; further including a switch operating member driven by the drive force transmitting mechanism and engageable with the first and second detection springs to switch them into and out of contact with the detection pin.

13. A sector drive assembly for a camera according to claim 12; wherein the drive force transmitting mechanism comprises a drive gear provided on a drive shaft of the electromagnetic actuator, and a sector drive gear in meshing engagement with and driven by the drive gear for driving the one or more sectors, the switch operating member being connected to the sector drive gear for movement therewith.

14. A sector drive assembly for a camera comprising:
a base plate having an aperture;
one or more sectors provided on the base plate for opening and closing the aperture;
an electromagnetic actuator for driving the one or more sectors between an open position in which the aperture is opened and a closed position in which the aperture is closed;
a drive force transmitting mechanism for transmitting a drive force of the electromagnetic actuator in aperture-opening and aperture-closing directions to the one or more sectors;
a first detecting unit for detecting a state in which the one or more sectors are in the open position, the first detecting unit including a first electrically conductive detection pin, and a first electrically conductive detection spring engageable with the first conductive detection pin and urging the drive force transmitting mechanism in the aperture-closing direction when the one or more sectors are in the open position;
a second detecting unit for detecting a state in which the one or more sectors are in the closed position, the second detecting unit including a second electrically conductive detection pin, and a second electrically conductive detection spring engageable with the second conductive detection pin and urging the drive force transmitting mechanism in the aperture-opening direction when the one or more sectors are in the closed position; and
a control unit for controlling the supply of power to the electromagnetic actuator based on signals from the first and the second detecting units.

15. A sector drive assembly for a camera according to claim 14; wherein the drive force transmitting mechanism has an angular motion converting mechanism for converting a prescribed amount of angular movement of the electromagnetic actuator into an amount of angular movement of the one or more sectors sufficient to drive the one or more sectors from one of an aperture-opening position and an aperture-closing position to the other of the aperture-opening position and the aperture-closing position.

16. A sector drive assembly for a camera according to claim 15; wherein the electromagnetic actuator comprises a pulse motor which undergoes the prescribed amount of angular movement in response to application of voltage or current pulses to the pulse motor for driving the one or more sectors to either the aperture-opening position or the aperture-closing position depending upon the polarity of the pulses.

17. A sector drive assembly for a camera according to claim 16; wherein the pulse motor comprises a rotor having a plurality of magnetic poles, a stator having a plurality of magnetic poles, and a drive coil for driving the rotor, an angle of rotation of the rotor in response to application of a voltage or current pulse to the drive coil being defined by a relationship between positions of the magnetic poles of the rotor and positions of the magnetic poles provided on the stator.

18. A sector drive assembly for a camera according to claim 17; wherein the positions of the magnetic poles provided on the stator are static stable positions at which the rotor is retained without the supply of power to the drive coil.

19. A sector drive assembly for a camera according to claim 14; wherein the drive force transmitting mechanism comprises a drive gear provided on a drive shaft of the electromagnetic actuator and a sector drive gear driven by the drive gear for driving the one or more sectors.

* * * * *